United States Patent
Abdoo et al.

(10) Patent No.: US 8,856,198 B2
(45) Date of Patent: Oct. 7, 2014

(54) RANDOM VALUE PRODUCTION METHODS AND SYSTEMS

(75) Inventors: David G. Abdoo, Gilbert, AZ (US);
Matthew W. Brocker, Gilbert, AZ (US);
Steven D. Millman, Gilbert, AZ (US);
Thomas E. Tkacik, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 349 days.

(21) Appl. No.: 13/436,074

(22) Filed: Mar. 30, 2012

(65) Prior Publication Data

US 2013/0262543 A1    Oct. 3, 2013

(51) Int. Cl.
*G06F 1/02*    (2006.01)

(52) U.S. Cl.
USPC .......................................... 708/250; 708/254

(58) Field of Classification Search
CPC ................................. G06F 7/58; G06F 7/582
USPC ................................................. 708/250, 254
See application file for complete search history.

(56) References Cited

U.S. PATENT DOCUMENTS

| | | | |
|---|---|---|---|
| 5,201,000 A | 4/1993 | Matyas et al. | |
| 7,007,050 B2 | 2/2006 | Saarinen | |
| 7,822,797 B2 | 10/2010 | Buer et al. | |
| 2004/0064491 A1* | 4/2004 | Rarick | 708/250 |
| 2008/0263117 A1* | 10/2008 | Rose et al. | 708/254 |
| 2010/0153478 A1 | 6/2010 | Aliseychik et al. | |
| 2011/0075840 A1* | 3/2011 | Zayas et al. | 380/46 |

OTHER PUBLICATIONS

National Institute of Standards and Technology, NIST Special Publication 800-90a, Recommendation for Random Number Generation Using Deterministic Random Bit Generators, Jan. 2012.
National Institute of Standards and Technology, The NIST SP 800-90A Deterministic Random Bit Generator Validation System (DRBGVS), Mar. 2012.
U.S. Appl. No. 13/436,052, Office Action—Rejection, mailed Jul. 15, 2014.

\* cited by examiner

*Primary Examiner* — Chuong D Ngo
(74) *Attorney, Agent, or Firm* — Sherry W. Schumm

(57) ABSTRACT

Embodiments of methods and systems for producing random values include a first module that provides a random data request (e.g., a request for an unspecified length of random data) to a random number generator. The random number generator generates random data in response to the random data request, and multiple random values derived from the random data are stored in a buffer. In response to receiving a request for a random value (e.g., an initialization vector), the first module produces the random value based on the multiple random values stored in the buffer. The system also may be configured to receive requests for other types of random values, and to fulfill those requests using random data that is not buffered (e.g., random data that is received directly from the random number generator in response to a request for a specified length of random data).

20 Claims, 4 Drawing Sheets

RANDOM VALUE PRODUCTION METHODS AND SYSTEMS

RELATED APPLICATION

This application is related to U.S. patent application Ser. No. 13/436,052, filed concurrently herewith.

TECHNICAL FIELD

Embodiments of the subject matter described herein relate generally to methods and apparatus for producing random values based on random data generated by a random number generator.

BACKGROUND

Both hardware- and software-implemented random number generators (also referred to as random bit generators) are commonly used in computing and communication systems to generate random or pseudo-random values. For example, a typical random number generator may implement a cryptographic hash function to produce a random number (also referred to as a "hash value" or "digest"). A variety of cryptographic hash functions have been developed, including commonly-used hash functions specified by the National Institute of Standards and Technology (NIST) under the "Secure Hash Algorithm" (SHA) designation, for example.

A computing or communication system may include one or more processing entities (e.g., processor cores, encryption engines, and so on) and a random number generator, which is configured to produce random numbers (e.g., hash values) for use by the processing entities. For any of a variety of purposes, a processing entity may request a random number from the random number generator. In response to the request, the random number generator may perform multiple hashing operations, produce the random number, and update its internal working state (i.e., internally-maintained values that are initialized based on entropy and other inputs, and modified after completion of each request) to prepare for the next request. This processing may take a significant amount of time for the random number generator to complete. For example, for a conventional SHA-256 hashing engine, production of a single random value (i.e., a 256 bit value) may take upwards of 200 clock cycles to complete.

Although the amount of time required to produce a random number may have little impact on performance for some types of applications, it may present a significant performance bottleneck for other types of applications. More particularly, some applications are configured to request and use random numbers in rapid sequence. In such applications, if the rate at which the random number generator is capable of producing a random number is significantly slower than the desired rate of use by the application, the random number generator's limitations may detrimentally impact the application's performance and/or throughput. Accordingly, with the ever increasing desire to increase system performance and speed, more efficient random number generation methods and apparatus are desired.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
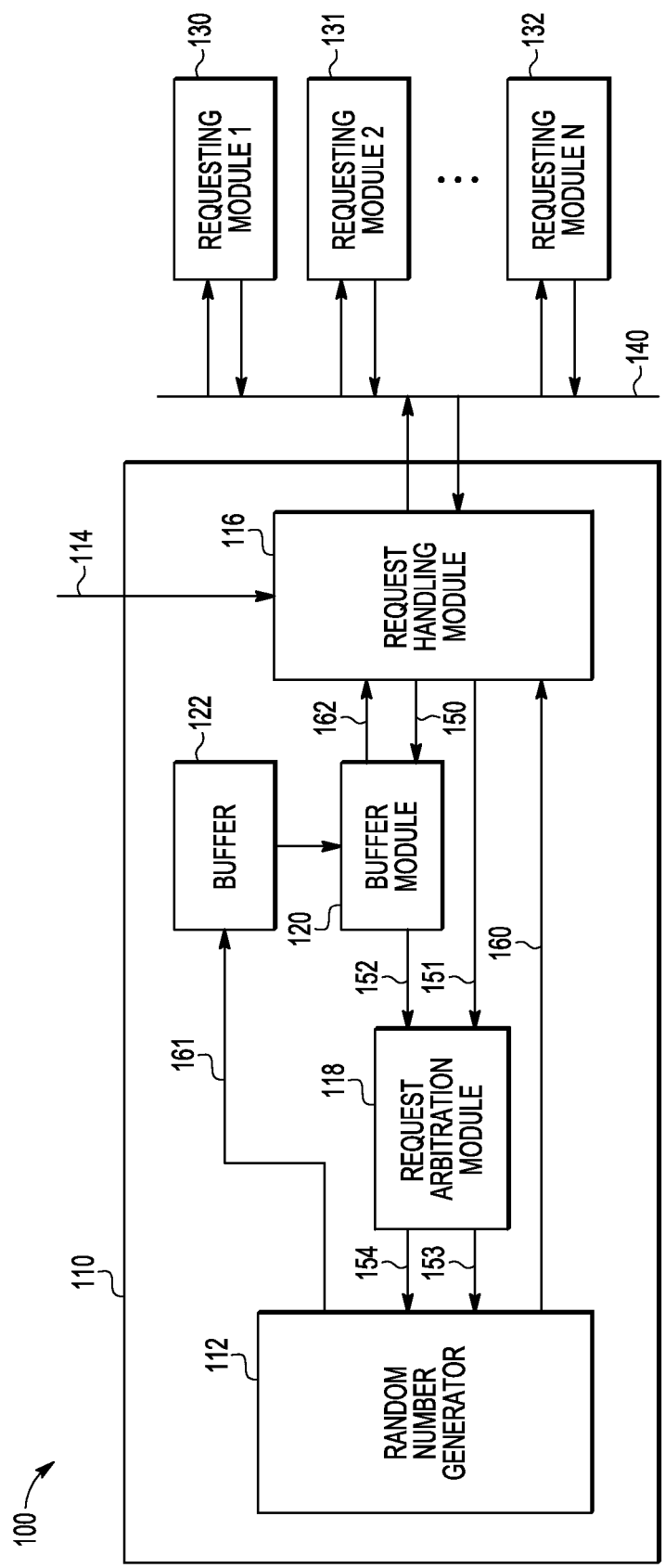
FIG. 1 is a simplified block diagram of an electronic system, in accordance with an example embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description. For the purpose of simplicity, the terms "random data," "random bit," "random number," and "random value" mean either (a) truly random data/bit/number/value (i.e., an instance of an unbiased random variable, or the output produced by a uniformly distributed random process) or (a) pseudorandom data/bit/number/value (i.e., a deterministic but effectively random data/bit/number/value produced by a process having internal action that is hidden from observation). Accordingly, references to the generation of "random data," a "random bit," a "random number," or a "random value" herein are intended to include generation of either (a) truly random or pseudorandom data/bit/number/value. As will be described in more detail below, and as these terms are used herein, an embodiment of a random number generator generates "random data" in the form of "random bits." A fixed-length output block of random bits that is generated by the random number generator as an instance of valid random data is referred to herein as a "random number." A "random value" is a value that is "derived from" a random number generated by the random number generator, where the term "derived from" means that the random number may have been modified to generate the random value, although not necessarily so (e.g., a random value that is "derived from" a random number may be identical to the random number). A random value may or may not have a same length as a random number generated by the random number generator.

Embodiments of the inventive subject matter may be used in any of a variety of different types of systems in which there is a desire to efficiently produce random values using a random number generator. For example, the various embodiments may be implemented in a system configured to protect data packets (e.g., Internet Protocol (IP) data packets) for communication between various system entities. More specifically, in such a system, IP data packets to be communicated between participants in a communication session (e.g., pairs of hosts, gateways, networks, and so on) may be processed according to Internet Protocol Security (IPsec) protocols specified by the Internet Engineering Task Force (IETF). The IPsec protocols set forth requirements for authenticating and encrypting IP packets prior to transmission. For example, the Encapsulating Security Payload (ESP) portion of the IPsec protocol suite sets forth the format for constructing and interpreting a data packet. Among other things, ESP specifies the starting location, within a packet, for a variably-sized field for payload data. When populated, the payload data field includes the protected payload of an original IP packet.

In order to produce the protected contents of the original IP packet in a particular mode, a first portion of the plaintext packet payload is combined with an Initialization Vector (IV) (e.g., a random value) of the same size, and the combination is input to a cipher algorithm (e.g., a cipher algorithm employing Advanced Encryption Standard ("AES") or some other algorithm). The resulting ciphertext is output to populate a portion of the payload data field of the protected IP packet. In addition, the resulting ciphertext is also fed back to be combined with a next portion of the plaintext packet payload prior to its encryption. This process is repeated until the entire packet payload has been encrypted. A different IV is used for each packet payload, which increases the randomness (and thus the un-decipherability) of the encrypted data packets.

According to an embodiment, an electronic system includes one or more system entities configured to request random data/numbers, a random number generator configured to produce random numbers in response to such requests, and data storage (e.g., a buffer) configured to store random values derived from the random numbers produced by the random number generator (e.g., IVs or other random values derived from those random numbers). In contrast with traditional systems in which a random number generator receives a distinct request for each random number used to generate an IV, embodiments include providing a random number generator with a request for an unspecified length of random data (e.g., an unspecified number of random numbers). The system further stores, in the data storage, a sequence of random values derived from the random numbers produced by the random number generator in response to the unspecified-length random data request (e.g., a sequence of IVs derived from the random numbers). The random values (e.g., the IVs) may then be read from the data storage by other system entities as needed. A sufficient quantity of random values is maintained in the buffer, in an embodiment, to attempt to ensure that the rate of random value production is sufficient to avoid a throughput bottleneck in the system. Accordingly, embodiments discussed herein may result in a significantly higher rate of random value (e.g., IV) production than is achievable with traditional systems. More specifically, because the random number generator may produce multiple random numbers in response to a single unspecified-length random data request, rather than producing only one random number per request as is done in traditional systems, a system in accordance with an embodiment may produce random values (e.g., IVs) at a significantly higher rate than a traditional system. In addition, because the random values are buffered, entities requesting the random values may receive the requested values more quickly than they would in a traditional system in which random values are produced only in response to individual requests to the random number generator (i.e., the random values are not buffered in advance of receiving the requests).

Although embodiments of methods and apparatus for producing random values in the context of a system for communicating according to IPsec protocols are discussed in detail herein, it is to be understood that the various embodiments may be used in other types of systems, as well. Those of skill in the art would understand, based on the description herein, how to incorporate the various embodiments into other types of systems that may benefit from the advantages produced by the embodiments. Accordingly, incorporation of the various embodiments into other systems is intended to be within the scope of the inventive subject matter.

FIG. 1 depicts an exemplary embodiment of an electronic system 100, according to an embodiment. System 100 includes random value production module 110 and from 1 to N requesting modules 130, 131, 132 (or "random value requesters"), where N may be any integer (e.g., any integer from 1 to 10 or more). As will be described in detail below, random value production module 110 is configured to produce random values in response to requests from requesting modules 130-132. According to an embodiment, for example, requesting modules 130-132 and random value production module 110 may communicate over a bi-directional system bus 140 or other communication mechanism. For example, any requesting module 130-132 may send a random value request to random value production module 110 over the bus 140, and in turn may receive the requested random value from the random value production module 110 over the bus 140.

Requesting modules 130-132 may include processor cores, cryptographic key generators (e.g., to generate Digital Signature Algorithm (DSA) keys, RSA keys, AES keys, and so on), cryptographic engines, protocol packet processors, padding modules, and various other types of modules configured to use random values for various purposes. In a particular embodiment, one or more of the requesting modules 130-132 may be configured to perform IPsec packet processing (e.g., implementation of an IPsec protocol to perform packet authentication and encryption). Such a processing module is referred to herein as an "IPsec processing module," and requesting module 130 will be used specifically as an example of an IPsec processing module. As discussed previously, IPsec packet processing may include combining a portion of a plaintext packet payload with an IV, performing a cipher operation on the combination, outputting the resulting ciphertext, and feeding back the resulting ciphertext to be combined with a next portion of the plaintext packet payload. According to an embodiment, in order to receive an IV, IPsec processing module 130 sends a random value request (or more specifically an "IV request") to random value production module 110 over bus 140. As will be described in more detail below, random value production module 110 sends IPsec processing module 130 an IV in response to each random value (or IV) request.

Besides IV requests, requesting modules 130-132 also may send requests for other types of random values. For example, a requesting module 130-132 may be a cryptographic key generator, and the requesting module 130-132 may send a request for a random value that may correspond to (or be used to create) a cryptographic key (e.g., a DSA private key, an AES key, and so on). Other types of requesting modules 130-132 may send requests for other types of random values, as well.

According to an embodiment, a random value request from a requesting module 130-132 indicates a random value type (e.g., IV, cryptographic key, and so on) and/or a random value length (e.g., 8 bytes, 16 bytes, and so on). A random value request also may include a requesting module identifier (ID), a sequence number, and/or other information which, when returned with the response, enables the requesting module 130-132 to recognize a response to the request and/or to use the random value provided in the response in a correct sequence. A random value provided by the random value production module 110 in response to a random value request may specify the information previously sent by the requesting module 130-132 (e.g., the requesting module ID and/or sequence number).

Random value production module 110 includes a random number generator 112, a request handling module 116, a request arbitration module 118, a buffer module 120, and a buffer 122, in an embodiment. Buffer module 120, request handling module 116, and request arbitration module 118 are shown as distinct blocks in FIG. 1 for the purpose of clarity of description. As used herein, the term "module" means a distinct combination of hardware and/or software that is configured to perform one or more distinct functions. Various modules of a system may be implemented using completely distinct hardware and/or software, or multiple modules may use common hardware and/or software. For example, although buffer module 120, request handling module 116, and request arbitration module 118 could be implemented using physically distinct hardware interconnected as shown in FIG. 1, various portions of buffer module 120, request handling module 116, and request arbitration module 118 may be implemented using common hardware, and/or may be differently interconnected, while still providing the functionality of the various embodiments described herein. For example, the functionality of request arbitration module 118 may be incorporated into buffer module 120 and/or request handling module 116, or vice versa, in alternate embodiments. Alternatively, the functionality of buffer module 120 may be incorporated into request arbitration module 118 and/or request handling module 116, or vice versa, in alternate embodiments. Accordingly, such variations are intended to be within the scope of the inventive subject matter.

According to an embodiment, storing (buffering) random values and producing them in response to random value requests may be selectively enabled in system 100. For example, random value buffering may be enabled by providing an enable input 114 to request handling module 116 by an external module. Once random value buffering is enabled, the system may support buffering, in buffer 122, of random values that are derived from random numbers generated by random number generator 112. When random value buffering is not enabled (or is disabled), random values are not buffered, and all random value requests are handled by request handling module 116 through direct interaction with random number generator 112. Most of the remainder of the description assumes that random value buffering is enabled, as the ability of system 100 to perform random value buffering provides some significant advantages over traditional systems.

Buffer 122 is a data structure configured to store random values derived from certain random numbers generated by random number generator 112 in a sequential manner. For example, buffer 122 may be a first-in, first-out (FIFO) or ring buffer consisting of a plurality of addressable elements within which random values derived from random numbers generated by random number generator 112 may be stored. In an embodiment, buffer 122 may be accessible only by buffer module 120 (e.g., only buffer module 120 accesses (e.g., reads from or writes to) elements of buffer 122). In an alternate embodiment, random number generator 112 and/or request handling module 116 may be able to access the values stored in the elements of buffer 122 directly.

In an embodiment, each element of buffer 122 is configured to store a random value having a length that corresponds to the length of each random number produced by the random number generator 112. For example, when the random number generator 112 is configured to produce random numbers having a length of 256 bits (i.e., 32 bytes), each element of buffer 122 may be configured to store random values that are 32 bytes long. In an alternate embodiment, each element of buffer 122 is configured to store a random value having a length that is different from (e.g., shorter than or longer than) the length of each random number produced by the random number generator 112. For example, in an embodiment, buffer 122 may be used to store IVs for consumption by IPsec processors (e.g., one or more of requesting modules 130-132), and each IV may have a length that is different from the length of a random number produced by random number generator 112. In such an embodiment, each element of buffer 122 may be configured to store a random value having a length corresponding to the length of an IV, rather than the length of each random number produced by the random number generator 112. Alternatively, each element of buffer 122 may be configured to store a random value that includes multiple IVs, where the multiple IVs are derived from a single random number produced by the random number generator 112.

For example, remaining consistent with the previously-given example, the random number generator 112 may be configured to produce random numbers each having a length of 32 bytes, and an IPsec processor may be configured to use IVs having a length of 16 bytes. In such a configuration, each element of buffer 122 may have a length of 16 bytes (corresponding to the length of an IV), and each random number generated by random number generator 112 may be divided into two IVs for storage in two consecutive elements of buffer 122. Alternatively, the two IVs may be stored in a single buffer element having a length of 32 bytes. In another example, an IPsec processor may be configured to use IVs having a length of 8 bytes, and each random number generated by random number generator 112 may be divided into four IVs for storage in four consecutive elements of buffer 122 (or the four IVs may be stored in a single buffer element having a length of 32 bytes).

Alternatively, in embodiments in which the length of the random numbers generated by random number generator 112 exceeds the length of the IVs consumed by the system, a portion of each random number generated by random number generator 112 may be discarded (e.g., only one IV is produced for each random number generated). In still other embodiments in which the length of the random numbers generated by random number generator 112 is shorter than the length of the IVs (or other random values) consumed by the system, multiple random numbers generated by the random number generator 112 may be used to create a single value to be stored within an entry of buffer 122. In embodiments in which a single IV is stored in each element of buffer 122, an IV may be provided directly from each element of buffer 122 (e.g., in response to an IV request from a requesting module 130-132). In alternate embodiments in which multiple IVs are stored in each element of buffer 122, an IV may be provided as a portion (e.g., half) of the bits stored in each element.

As will be described in more detail later, buffer module 120 is configured to make requests (via request interface 152) to the random number generator 112 for random numbers. In an embodiment, the random number generator 112 produces random numbers in response to the random data requests from buffer module 120, and the random number generator 112 pushes the random numbers into the buffer 122 (e.g., in a single clock cycle via random number interface 161). In an alternate embodiment, buffer module 120 receives the random numbers from the random number generator 112, and buffer module 120 stores random values derived from the random numbers in buffer 122. Either way, a write pointer is maintained (e.g., by buffer module 120 and/or random number generator 112), which indicates the element in buffer 122 in which the most recent random value was stored.

Buffer module 120 also is configured to receive requests for random values from request handling module 116 (via request interface 150), and to provide random values stored in the buffer 122 to request handling module 116 in response to requests (via random value interface 162). Buffer module 120 is further configured to maintain a read pointer associated with buffer 122 (e.g., indicating the element in buffer 122 from which the most recently provided random value was read).

Based on analyses of the write and read pointers, buffer module 120 monitors the quantity of un-accessed random values stored in buffer 122 (e.g., a difference between the write and read pointers), and attempts to keep the buffer 122 "full" (i.e., at a desired level of fullness, which may be 100% full or some other lower level), in an embodiment. According to a particular embodiment, buffer module 120 is configured to determine whether a quantity of un-accessed random values stored in buffer 122 is below a threshold, and when it is, to assert a random data request via request interface 152. As will be described in more detail later, in an embodiment, buffer module 120 asserts a request for an unspecified length of random data, referred to as an "unspecified-length random data request." As its name implies, an unspecified-length random data request does not specify an amount of random data to be produced by the random number generator 112. Instead, random number generator 112 will continue to produce random numbers, without updating its internal working state (e.g., in accordance with National Institute of Standards and Technology (NIST) standards), until the unspecified-length random data request is de-asserted. Accordingly, in response to a single random data request, buffer 122 may receive multiple random numbers from random number generator 112 (either directly or via buffer module 120).

Request handling module 116 is configured to receive random value requests (e.g., from requesting modules 130-132 over bus 140), and to obtain and provide random values in response to the random value requests (e.g., by sending the requested random values to the requesting modules 130-132 over bus 140). A random value produced by request handling module 116 may be an unmodified version of a random number generated by the random number generator 112 or a derivation of a random number generated by the random number generator 112, in various instances. For example, request handling module 116 may receive a request for a random value of a particular size from a requesting module 130-132, and request handling module 116 may either obtain a random number from random number generator 112 or obtain a random value from buffer module 120 in response to the request. When the obtained random number/value is longer than the requested random value, request handling module 116 may discard a portion of the obtained random number/value. Conversely, when an obtained random number/value is shorter than the requested random value, request handling module 116 may obtain multiple random numbers/values and combine them to produce the requested random value.

When request handling module 116 receives a random value request from a requesting module 130-132, request handling module 116 evaluates the request to determine whether the random value to be provided should be obtained from the buffer module 120 or directly from the random number generator 112, in an embodiment. For example, when request handling module 116 receives a random value request for a first type of random value (e.g., an IV request) from a requesting module 130-132 (e.g., an IPsec processor), request handling module 116 may send a request for a random value of the first type to buffer module 120 on request interface 150 (e.g., request handling module 116 may be considered a "random value requester" in this context). In response, buffer module 120 may retrieve a random value (e.g., an IV) from buffer 122, update its read pointer accordingly, and provide the random value (e.g., the IV) to request handling module 116 on random value interface 162. Request handling module 116 may then send the requested random value (e.g., the IV) to the requesting module 130-132. In an alternate embodiment, request handling module 116 may directly read the random value (e.g., the IV) from buffer 122.

The storage of random values in buffer 122 enables these first types of random value requests to be serviced by the request handling module 116 at a rate that may be faster than the rate that the random number generator 112 could produce random numbers in response to individual random data requests. Accordingly, these first types of random value requests may be considered "high runner requests." For example, request handling module 116 may receive IV requests from an IPsec processor (e.g., one of requesting modules 130-132) at a rate that is faster than the rate that random number generator 112 could produce random numbers in response to individual random data requests (each of which would require random number generator 112 to perform a time-consuming internal state update). Embodiments of the request mechanisms employed by buffer module 120 and the storage of multiple random numbers in buffer 122 enables request handling module 116 to obtain IVs from buffer 122 more rapidly than it could obtain IVs from random number generator 112 by issuing individual random data requests for each IV to the random number generator 112. Accordingly, request handling module 116 obtains random values from buffer module 120 in response to high runner requests, rather than obtaining random numbers directly from random number generator 112 in response to high runner requests.

In contrast, when request handling module 116 receives other types of random value request from a requesting module 130-132, request handling module 116 may request a random number from the random number generator 112 via request interface 151. As will be described in more detail later, in an embodiment, request handling module 116 asserts a request for a specified-length of random data, which request is referred to herein as a "specified-length random data request." As its name implies, a specified-length random data request includes an indication of a quantity of random data to be produced by the random number generator 112. In response to such a request, random number generator 112 will produce only the specified-length of random data (e.g., a single random number), and will thereafter update its internal state. According to an embodiment, request handling module 116 may specify lengths from 1 byte to numerous bytes (e.g., hundreds or thousands of bytes) of random data, although a module may specify other lengths, as well.

As the above description indicates, both buffer module 120 and request handling module 116 may request random data/numbers from random number generator 112. In an embodiment, random number generator 112 does not include logic for arbitrating between requests received from buffer module 120 and request handling module 116 during overlapping or conflicting time intervals. Accordingly, in an embodiment, system 100 may include request arbitration module 118, which is configured to arbitrate between overlapping random data requests from buffer module 120 and request handling module 116. Although request arbitration module 118 is shown to be distinct from random number generator 112, buffer module 120, and request handling module 116, all or portions of request arbitration module 118 may be incorporated into random number generator 112, buffer module 120, and/or request handling module 116, in other embodiments.

According to an embodiment, random number generator 112 is capable of generating only one random number at a time. In other words, random number generator 112 may service only one random data request at a time. In order to provide random data requests in a manner that achieves system performance objectives (e.g., keeping buffer 122 sufficiently full so that high runner requests can be satisfied rapidly while avoiding starvation for other types of requests), request arbitration module 118 is configured to determine which of multiple random data requests received from buffer module 120 (via random data request interface 152) and request handling module 116 (via random data request interface 151) is to be provided to random number generator 112 at any given time.

According to an embodiment, request arbitration module 118 gives priority to random data requests from buffer module 120 over requests from request handling module 116. When buffer module 120 provides a random data request on random data request interface 152 and no other request is pending with the random number generator 112, request arbitration module 118 essentially passes the random data request from the buffer module 120 through to the random number generator 112 on random data request interface 154. In response, random number generator 112 provides the requested random data on random number interface 161. Similarly, if request handling module 116 provides a random data request on random data request interface 151 and no other request is pending with the random number generator 112, request arbitration module 118 essentially passes the random data request through to the random number generator 112 on random data request interface 153. In response, random number generator 112 provides the requested random data on random number interface 160.

However, if requests from buffer module 120 and request handling module 116 were substantially simultaneously received, request arbitration module 118 would first assert (on random data request interface 154) an unspecified-length random data request corresponding to the request from buffer module 120, in an embodiment, and would hold a specified-length random data request corresponding to the request from request handling module 116 until completion of the buffer control request. In addition, when a request from request handling module 116 is received by request arbitration module 118 during a time when request arbitration module 118 has an unspecified-length random data request asserted on random data request interface 154 (i.e., corresponding to a request from buffer module 120), request arbitration module 118 may maintain the currently-asserted request for a period of time before de-asserting the request on random data request interface 154 and asserting a specified-length random data request on random data request interface 153. Either way, request arbitration module 118 ensures that only a single random data request is provided to random number generator 112 at any given time.

Random number generator 112 performs various functions relating to the generation of random numbers. The functions performed by random number generator 112 may be contained within a single device (e.g., as shown in FIG. 1), or may be distributed across multiple devices, in various embodiments. Either way, random number generator 112 is configured to produce random numbers upon request by external entities (e.g., buffer module 120, request handling module 116 and/or request arbitration module 118), where each random number includes a specific number of random data bits.

More specifically, random number generator 112 includes a generate function, which produces random data in accordance with random data requests received by the random number generator 112. In order to produce the random numbers, random number generator 112 includes one or more cryptographic primitives (e.g., a hash function or block cipher algorithm). For example, random number generator 112 may produce random numbers based on a hash function (e.g., a SHA function, such as SHA-256 or some other SHA function), where the type of hash function determines the output block length (i.e., the number of bits in each random number). For example, random number generator 112 may be configured to generate output blocks of 160, 224, 256, 384 or 512 bits of random data at a time (i.e., each random number generated is 160, 224, 256, 384 or 512 bits long), although random number generator 112 may be configured to generate output blocks of different numbers of bits at a time, as well. For the purpose of example only, the description herein may refer to random number generator 112 being configured to generate output blocks of 256 bits (i.e., 32 bytes) of random data at a time, although the example is not intended to be limiting.

In response to receiving a specified-length random data request, the random number generator 112 produces the requested quantity of random data (e.g., by performing one or more hashing or cipher operations), and updates its internal working states to prepare for the next request. In contrast, in response to receiving an unspecified-length random data request, the random number generator 112 continuously produces output blocks of random data (e.g., by performing one or more hashing or cipher operations) until the request is de-asserted, and thereafter updates its internal working states to prepare for the next request. In some cases, the random number generator 112 may stop producing random data prior to de-assertion of the request, such as when the random number generator 112 determines that a re-seed operation must be performed.

According to an embodiment, random number generator 112 is a Deterministic Random Bit Generator (DRBG) configured to generate random bits substantially according to an algorithm specified or recommended by the National Institute of Standards and Technology (NIST) (e.g., NIST Special Publication 800-90A, *Recommendation for Random Number Generation Using Deterministic Random Bit Generators*, January, 2012). According to a more specific embodiment, random number generator 112 is a Hash_DRBG (i.e., a DRBG that utilizes a hash function to perform random number generation). In other embodiments, random number generator 112 may be a different type of random number generator (e.g., a non-deterministic random bit generator or a DRBG configured to generate random bits according to other algorithms (e.g., approved hash functions, block ciphers, number theoretic problems, and so on)).

According to an embodiment, and as will be described in more detail in conjunction with FIGS. 2 and 3, random number generator 112 includes a plurality of I/Os (inputs/outputs), where two or more sets of the I/Os correspond to "request ports." For example, random data request interface 153 may be coupled to one request port, and random data request interface 154 may be coupled to another request port. Each request port is configured to receive requests for random data (e.g., from request arbitration module 118, in an embodiment, or directly from buffer module 120 and request handling module 116, in another embodiment), and to provide the random numbers in response to the requests (e.g., via random number interfaces 160, 161). According to an embodiment, random number generator 112 includes two request ports, where one request port is configured to handle unspecified-length random data requests, and the other request port is configured to handle requests for specified-length random data requests. The former port is referred to herein as an "unspecified-length request port," and the later port is referred to herein as a "specified-length request port." According to an embodiment, the unspecified-length random data requests correspond to random data requests originating from buffer module 120, and the specified-length random data requests correspond to random data requests originating from request handling module 116 based on non-high runner types of random value requests from requesting modules 130-132 (e.g., non-IV types of requests). Accordingly, random data requests originating from buffer module 120 are received on the unspecified-length request port, and random data requests originating from request handling module 116 based on non-high runner types of random value requests are received on the specified-length request port.

When random number generator 112 detects a random data request asserted on the unspecified-length request port, random number generator 112 generates a sequence of random numbers until the random data request is de-asserted. According to an embodiment, while servicing the unspecified-length random data request, random number generator 112 does not update its internal state between consecutively-generated output blocks of random data (e.g., between consecutively generated random numbers). Instead, random number generator 112 updates its internal state only upon de-assertion of the unspecified-length random data request. In contrast, when random number generator 112 detects a random data request asserted on the specified-length request port, random number generator 112 determines the requested data length, and produces a quantity of random data corresponding to the requested data length, thereafter updating its internal state to prepare for the next request.

Figure 2:
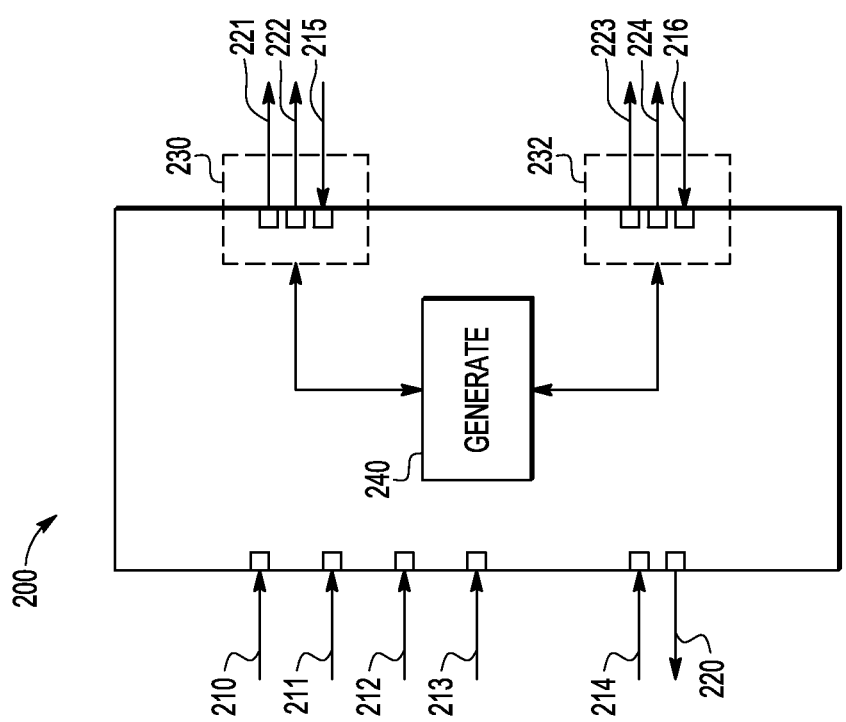
FIG. 2 is a simplified block diagram of a multiple-port random number generator, in accordance with an example embodiment.

FIG. 2 is a simplified block diagram of a multiple-port random number generator 200, in accordance with an example embodiment. For example, random number generator 200 may be used in a system in which unspecified-length random numbers and specified-length random numbers may be requested (e.g., as random number generator 112 in system 100, FIG. 1). According to an embodiment, random number generator 200 includes a plurality of inputs 210-216 and a plurality of outputs 220-224. For example, according to an embodiment, random number generator 200 includes one or more entropy inputs 210 (only one of which is shown), an instantiate input 211, an un-instantiate input 212, a reseed instantiation input 213, and a test input 214. In addition, random number generator 200 includes a test output 220, in an embodiment. The purposes of the above-mentioned inputs and outputs is not discussed in detail herein, as their purposes are known and outside the scope of this description.

In addition to the above-mentioned inputs and outputs, random number generator 200 includes a first set of I/Os 215, 221, 222 corresponding to a first port 230 (e.g., an unspecified-length request port) and a second set of I/Os 216, 223, 224 corresponding to a second port 232 (e.g., a specified-length request port). The first port 230 includes a random data request input 215, a random data output 221, and a status output 222, in an embodiment. Similarly, the second port 232 includes a random data request input 216, a random data output 223, and a status output 224, in an embodiment. Although each of the inputs 215, 216 and outputs 221-224 are shown as single I/Os, implying that the inputs 215, 216 and outputs 221-224 may be serial I/Os, this is for convenience only. In various embodiments, some or all of the inputs 215, 216 and outputs 221-224 may be serial I/Os, and some or all of the inputs 215, 216 and outputs 221-224 may be parallel I/Os. Similarly, the interfaces to which they connect (e.g., request interfaces 153, 154 and random number interfaces 160, 161, FIG. 1) may be serial or parallel interfaces. According to an embodiment, the random data output 221 has a first width (i.e., number of bits that can be output in parallel during a single clock cycle), and the random data output 223 has a second width, where the first width and the second width may be the same as or different from each other.

Among other things, random number generator 200 implements a generate function 240, which is configured to generate random data in response to random data requests received on random data request inputs 215, 216. For example, in response to detecting assertion of an unspecified-length random data request on random data request input 215, the generate function 240 begins producing output blocks of random data (e.g., by performing one or more hashing or cipher operations), and making the output blocks of random data available on random data output 221. According to an embodiment, the random number generator 200 pushes the random data into the random value buffer (e.g., buffer 122, FIG. 1) in a single clock cycle, as soon as each output block of random data has been generated. In an alternate embodiment, each time a new output block of random data is available on random data output 221, the generate function 240 provides a "SUCCESS" indicator on status output 222. The "SUCCESS" indicator on status output 222 indicates to the requesting entity (e.g., to buffer module 120, FIG. 1) that a random number is available on the random data output 221. The generate function 240 continues to output random data on random data output 221 (and to either push the random data into the random value buffer or provide "SUCCESS" indicators on status output 222) until the random number generator 200 detects that the unspecified-length random data request on random data request input 215 has been de-asserted. At that time, the generate function 240 updates its internal states to prepare for a next received request. In some cases, the generate function 240 may need to stop producing random data (e.g., when a re-seed is required) and may provide an "ERROR" indicator on status output 222. However, error handling is not within the scope of this disclosure and is not discussed in detail herein.

In contrast to its handling of unspecified-length random data requests, in response to detecting assertion of a specified-length random data request on random data request input 216, the generate function 240 produces only the quantity of random data specified in the request (e.g., by performing one or more hashing or cipher operations), and outputs the random data on random data output 223. According to an embodiment, random data request input 216 may convey a single signal, which indicates the length of random data requested (e.g., a bus conveying a number of bytes of requested random data). In such an embodiment, the random number generator 200 may consider the request to be valid as long as the indicated length is non-zero. In another embodiment, random data request input 216 may convey both a length signal and a valid signal (e.g., random data request input 216 actually may include multiple inputs: one to convey length, and another to indicate when a request is valid). Either way, random number generator 200 may produce the requested quantity of random data in response to a valid request on random data request input 216. When the random data is available on random data output 223, the generate function 240 provides a "SUCCESS" indicator on status output 224. The "SUCCESS" indicator on status output 224 indicates to the requesting entity (e.g., to request handling module 116, FIG. 1) that a random number is available on the random data output 224, and the requesting entity may then pull the random number from the random data output 223. Upon completion of the request, the generate function 240 updates its internal states to prepare for a next received request.

In the embodiment illustrated in FIG. 2, each port includes a random data request input 215, 216, a random data output 221, 223, and a status output 222, 224. In an alternate embodiment, a random number generator may implement multiple random data request inputs and only a single random data output and/or status output. For example, FIG. 3 is a simplified block diagram of a multiple-port random number generator 300, in accordance with such an example embodiment. As with random number generator 200 (FIG. 2), random number generator 300 may be used in a system in which unspecified-length random numbers and specified-length random numbers may be requested (e.g., as random number generator 112 in system 100, FIG. 1). According to an embodiment, random number generator 300 includes one or more entropy inputs 310 (only one of which is shown), an instantiate input 311, an un-instantiate input 312, a reseed instantiation input 313, a test input 314, and a test output 320, also similar to random number generator 200. In addition, random number generator 300 also implements a generate function 340.

In contrast with the embodiment illustrated in FIG. 2, however, an unspecified-length request port 330 of random number generator 300 includes only random data request input 315, and a specified-length request port 332 of random number generator 300 includes only random data request input 316 (e.g., conveying a length of requested random data and, possibly, a valid request signal). A single random data output 321 is used to output random data for both unspecified-length and specified-length random data requests. In addition, a single status output 322 is used to indicate the status of generating random data for both unspecified-length and specified-length random data requests. Construed another way, the random data request inputs 315, 316 are specified as parts of two distinct ports, and the random data output 321 and status output 322 are shared by the two ports. When implemented in a system, only one of the requesting entities (e.g., buffer module 120, request handling module 116, FIG. 1) would interface with each of the random data request inputs 315, 316, but both requesting entities would interface with the shared random data output 321 and status output 322.

Figure 3:
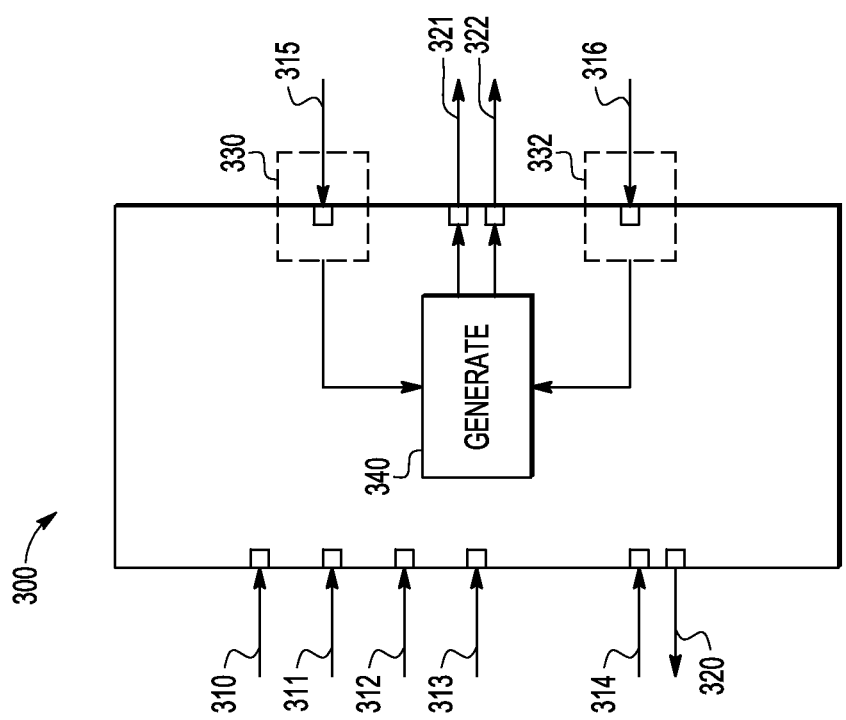
FIG. 3 is a simplified block diagram of a multiple-port random number generator, in accordance with another example embodiment.

Although FIGS. 1-3 illustrate and describe random number generators 112, 200, 300 that each include two request ports (e.g., one unspecified-length request port and one specified-length request port), a random number generator may include more than two request ports and/or more than one request port of each type, in other embodiments. In another alternate embodiment, the request port configured to service requests originating from the buffer module (e.g., buffer module 120, FIG. 1) may be a specified-length request port rather than an unspecified-length request port, and the buffer module may issue requests for specific quantities of random data to be stored in the buffer (e.g., buffer 122, FIG. 1), rather than issuing requests for an unspecified-length of random data. In still other embodiments, a random number generator may include one or more additional ports (e.g., a general random data port, an external request port (connected to modules other than those illustrated in FIG. 1), and a mask generation port (e.g., as part of an AES engine)).

Figure 4:
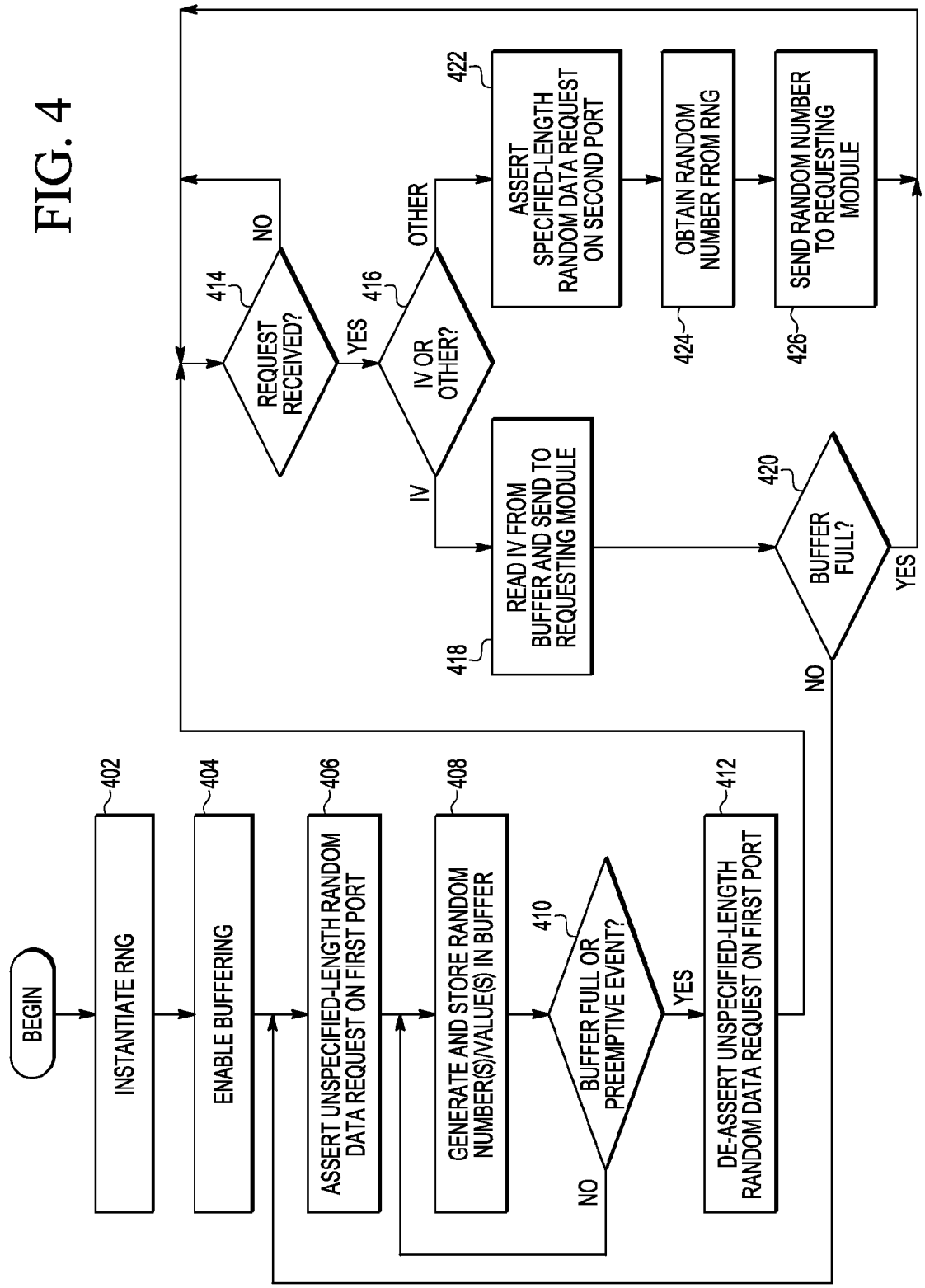
FIG. 4 is a flowchart of a method for a random value production module to produce random numbers at the request of requesting modules, in accordance with an example embodiment.

FIG. 4 is a flowchart of a method for a random value production module (e.g., module 110, FIG. 1) to produce random values at the request of requesting modules (e.g., requesting modules 130-132, FIG. 1), in accordance with an example embodiment. For purpose of example, the method will be described using IVs as a type of "high runner" random value that may be requested and retrieved from a buffer (e.g., buffer 122, FIG. 1). It is to be understood that other embodiments may include the request and production of other types of random values that may be requested and retrieved from a buffer. Accordingly, such other embodiments are intended to be within the scope of the inventive subject matter.

The method may begin, for example, upon power up or re-boot of the host system (e.g., a computer system within which the random value production module is incorporated), or upon the occurrence of some other startup event. For purpose of ease of explanation, the description below assumes that the system's random number generator (e.g., random number generator 112, FIG. 1) has not been instantiated at this point, and that the buffer (e.g., buffer 122, FIG. 1) associated with the buffer module (e.g., buffer module 120, FIG. 1) is empty.

Accordingly, the method may begin, in block 402, by instantiating the random number generator (RNG). Although random number generator instantiation is outside the scope of this disclosure, an embodiment of a random number generator instantiation process will be described briefly below. In order to instantiate the random number generator, an entropy input is provided (e.g., on entropy input 210, 310, FIGS. 2, 3). Within the random number generator, the entropy input is combined with other inputs (e.g., a nonce and/or a personalization string) to create a seed from which the random number generator creates an initial internal working state. Although not discussed in detail herein, reseeds occasionally may be performed as well (e.g., when the end of the seed life has been reached, when the random number generator is repurposed, or at other times). Regardless, once a seed is available, the random number generator establishes its initial internal working state by deriving one or more values from the seed and initiating a count of the number of requests or blocks produced since the instantiation was seeded (or reseeded). A status may be returned from the instantiate function to indicate that the instantiation process was successful or failed.

In block 404, random value buffering may be enabled (e.g., by providing an enable input 114, FIG. 1, to request handling module 116 by an external module). Once random value buffering is enabled, the system may support buffering (e.g., in buffer 122, FIG. 1) of random values based on random numbers generated by the random number generator. If random value buffering is not enabled (or is disabled), random values are not buffered, and all random value requests are handled (e.g., by request handling module 116) through direct interaction with the random number generator.

In blocks 406-412, a process is performed to "fill" the random number buffer (e.g., buffer 122, FIG. 1) to a predefined level (e.g., to 100% full or some lower percentage). Desirably, the buffer fill process is initiated and completed prior to the random value production module receiving any requests for random values from requesting modules (e.g., requesting modules 130-132, FIG. 1). To start the process, in block 406, an unspecified-length random data request is asserted on a first port (e.g., via unspecified-length request input 215, 315, FIGS. 2, 3) of the random number generator. For example, the unspecified-length random data request may be asserted directly by a buffer module (e.g., buffer module 120, FIG. 1) or indirectly by request arbitration circuitry (e.g., request arbitration module 118, FIG. 1).

In response to the request, in block 408, the random number generator begins producing random numbers and storing the random numbers in the buffer (e.g., buffer 122, FIG. 1), in an embodiment. In an alternate embodiment, the random number generator indicates (e.g., via status output 222, 322, FIGS. 2, 3) when a random number is available, and the buffer module obtains the random number from the random number generator and stores a random value based on the random number in the buffer. Either way, the random number may be stored as is (e.g., in the same form as it was generated by the random number generator), or it may be modified before it is stored (e.g., it may be divided into segments corresponding to the size of an IV, such as when the random number produced by the random number generator is twice as long as an IV, and thus two IVs may be produced from each random number, as discussed previously). The write pointer is updated each time a new random number (or IV) is written into the buffer.

Based on the buffer pointers (e.g., the write pointer and a read pointer), the buffer module determines whether the buffer is sufficiently full or some other preemptive event has occurred, in block 410. If not, the buffer module continues to assert the unspecified-length random data request, and the random number generator continues to generate and store random numbers in the buffer (block 408). According to an embodiment, certain preemptive events may cause the buffer module to discontinue filling the buffer (i.e., by de-asserting the unspecified-length random data request) prior to the buffer being considered sufficiently full. For example, the buffer module may de-assert the unspecified-length random data request prior to the buffer being sufficiently full when a specified-length random data request has been asserted (e.g., by request handling module 116, FIG. 1). In such an embodiment, the buffer module may de-assert the unspecified-length random data request immediately, or the buffer module may wait a period of time until the buffer module de-asserts the unspecified-length random data request (e.g., until an additional quantity of random data has been produced as a result of the unspecified-length random data request). For example, when the buffer module determines that enough random data has been supplied to ensure that a minimum number of entries are stored in the buffer, the buffer module may de-assert the unspecified-length random data request. The buffer module may de-assert the unspecified-length random data request in response to other preemptive events, as well, in other embodiments. When the buffer module determines that the buffer is sufficiently full or a preemptive event has occurred, the buffer module de-asserts the unspecified-length random data request on the first port, in block 412, and the random number generator ceases to produce random data for storage in the buffer, in response. Because the initial unspecified-length random data request is asserted for as long as it takes to fill the buffer (assuming no preemptive event occurs during that time), in an embodiment, the initial unspecified-length random data request may take a significantly longer time to complete than subsequent unspecified-length random data requests (e.g., a later unspecified-length request that is asserted based on a determination in block 420 that the buffer has become insufficiently full). In other words, the start-up time for generating the random data initially used to fill the buffer may be significantly higher than the time to generate random data in response to subsequent unspecified-length random data requests. This may be the case in some circumstances. However, in some cases, a subsequent unspecified-length random data request may be asserted for a longer period of time than the initial unspecified-length random data request. For example, when conditions persist in which random values are being provided from the buffer at approximately the same rate as the random number generator populates the buffer, and no preemptive event occurs, the corresponding unspecified-length random data request may be asserted for a relatively long period of time.

At this point, the random value production module waits, in block 414, for an incoming request for a random value from a requesting module (e.g., requesting modules 130-132, FIG. 1). When a request for a random value has been received from a requesting module, the random value production module (e.g., request handling module 116, FIG. 1) determines the type of request, in block 416. More specifically, the random value production module determines if the request corresponds to a request for some type of random value that is stored in the buffer (e.g., an IV) or to some other type of random number. When the random value production module determines that the request is for a value stored in the buffer (e.g., an IV), the random value production module reads a value from the buffer, and sends the value to the requesting module, in block 418. For example, the request handling module may request a value from a buffer module (e.g., buffer module 120, FIG. 1), the buffer module may provide the value from the buffer, in response, and the buffer module may update the read pointer accordingly.

In block 420, the buffer module may determine whether or not the buffer is still considered to be sufficiently full based on an analysis of the buffer pointers (e.g., the read and write pointers). For example, in an embodiment, the buffer may be considered to be sufficiently full when the buffer module has determined that a threshold percentage or number of un-read random values are still in the buffer. Although the percentage could be as high as 100%, the percentage may be set as less than 100% so that the buffer module does not try to re-fill the buffer after every single random value request. In any event, when the buffer module determines that the buffer is not sufficiently full, the buffer module may re-assert an unspecified-length random data request on the first port, in block 406, and the method may iterate as shown. In an embodiment, the buffer module (or arbitration logic such as request arbitration module 118, FIG. 1) may wait to assert the unspecified-length random data request on the first port if the random number generator already is fulfilling a specified-length random data request (or some other request). Referring again to block 420, when the buffer module determines that the buffer is still considered to be sufficiently full, the method may iterate as shown (i.e., the process may return to waiting for an incoming random value request from a requesting module, in block 414).

Referring again to block 416, when the random value production module determines that the random value request is a type of request other than a request for a value in the buffer, a specified-length random data request is asserted on a second port (e.g., via specified-length request input 216, 316, FIGS. 2, 3) of the random number generator, in block 422. For example, the specified-length random data request may be asserted directly by request handling module (e.g., request handling module 116, FIG. 1) or indirectly by request arbitration circuitry (e.g., request arbitration module 118, FIG. 1).

In response to the request, the random number generator produces the requested quantity of random data. The random number generator also indicates (e.g., via status output 224, 322, FIGS. 2, 3) when the random data is available. When random data is available, the random value production module (e.g., the request handling module 116, FIG. 1) obtains the random number corresponding to the random data from the random number generator, in block 424, and sends a random value derived from the random number to the requesting module, in block 426. The method then iterates as shown.

Figure 5:
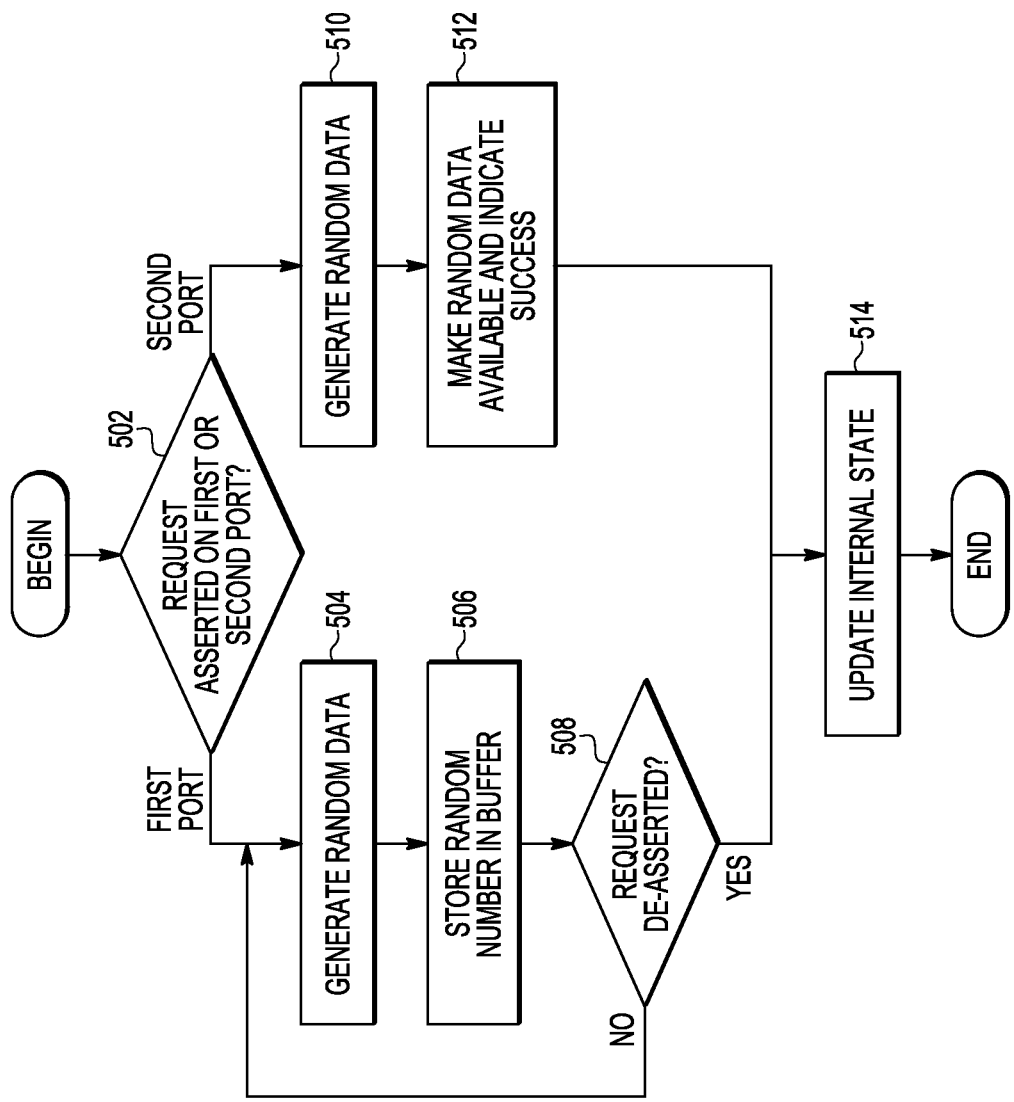
FIG. 5 is a flowchart of a method for a random number generator to generate random numbers in response to unspecified-length random number requests and specified-length random number requests, in accordance with an example embodiment.

FIG. 5 is a flowchart of a method for a random number generator (e.g., random number generator 112, 200, 300, FIGS. 1-3) to generate random numbers in response to unspecified-length random data requests and specified-length random data requests, in accordance with an example embodiment. For simplicity, the process description below does not describe contingencies when a random number generator is unsuccessful at generating random data (e.g., when a re-seed is needed or due to some other event). Those of skill in the art would understand, based on the description herein, how to modify the process to include random data generation failure contingencies.

In any event, the method may begin when the random number generator receives a random data request. When the request has been made on a first port (e.g., port 230, 330, FIGS. 2, 3) corresponding to unspecified-length random data requests (as indicated by decision block 502), then in block 504, the generate function of the random number generator generates random data (e.g., an output block of random data, such as a 32 byte number) based on the current internal state of the random number generator. Assuming that the random data was generated successfully, then in block 506, the random number generator stores the random number in a buffer (e.g., external buffer 122, FIG. 1). Alternatively, the random number generator may make the random data available on the random number output (e.g., random number output 221, 321, FIGS. 2, 3), and indicate that the random number generation was successful on a status output (e.g., status output 222, 322, FIGS. 2, 3). The random number generator then determines, in block 508, whether the unspecified-length random data request has been de-asserted on the first port. If not, the method iterates as shown. If so, the random number generator updates its internal state, in block 514, and the method ends.

Referring again to block 502, when a random data request has been made on a second port (e.g., port 232, 332, FIGS. 2, 3) corresponding to specified-length random data requests, then in block 510, the generate function of the random number generator generates the quantity of random data specified in the request based on the current internal state of the random number generator. Assuming that the random data was generated successfully, then in block 512, the generate function makes the random data available on the random number output (e.g., random number output 223, 321, FIGS. 2, 3), and indicates that the random number generation was successful on a status output (e.g., status output 224, 322, FIGS. 2, 3). The random number generator then updates its internal state, in block 514, and the method ends.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

An embodiment of a method for producing random values includes providing a first random data request to a random number generator, and the random number generator generating first random data in response to the first random data request. The method further includes storing multiple random values derived from the first random data in a data structure. In response to receiving a first random value request (for a random value of a first type) from a first random value requester, a random value of the first type is produced and sent to the first random value requester. The random value is based on a random value of the multiple random values stored in the data structure. The method further includes providing a second random data request to the random number generator in response to receiving a second random value request for a random value of a second type, receiving second random data from the random number generator in response to sending the second random data request, and sending the random value of the second type, which is derived from the second random data, to a requester of the random value of the second type.

Another embodiment of method for producing random values includes providing a first random data request to a random number generator, and the random number generator generating first random data in response to the first random data request. The method further includes storing multiple random values derived from the first random data in a buffer. In response to receiving an initialization vector request from an initialization vector requestor, an initialization vector is produced based on one of the multiple random values stored in the buffer, and the initialization vector is sent to the initialization vector requester. The method further includes providing a second random data request to the random number generator in response to receiving a random value request for a random value other than an initialization vector, and receiving second random data from the random number generator in response to sending the second random data request.

An embodiment of a system includes a random number generator, a data structure, a first module, and a second module. The random number generator is configured to generate random data in response to random data requests. The data structure is configured to store multiple random values, which are derived from first random data generated by the random number generator in response to first random data requests. The first module, which is coupled to the random number generator and to the data structure, is configured to provide the first random data requests to the random number generator. The first module is also configured to receive first random value requests for first random values of a first type from a requester of the first random values, and to send the first random values to the requester of the first random values in response to the first random value requests. The first random values are derived from the multiple random values stored in the data structure. The second module, which is coupled to the random number generator, is configured to provide second random data requests to the random number generator in response to receiving second random value requests for second random values of a second type from a requester of the second random values, to receive second random data from the random number generator in response to sending the second random data requests, and to send the second random values, which are derived from the second random data, to the requester of the second random values.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for producing random values, the method comprising the steps of:
providing a first random data request to a random number generator;
generating, by the random number generator, first random data in response to the first random data request;
storing multiple random values derived from the first random data in a data structure;
receiving, from a first random value requester, a first random value request for a random value of a first type;
in response to receiving the first random value request, producing the random value of the first type based on a random value of the multiple random values stored in the data structure;
sending the random value of the first type to the first random value requester;
providing a second random data request to the random number generator in response to receiving a second random value request for a random value of a second type;
receiving second random data from the random number generator in response to sending the second random data request; and
sending the random value of the second type, which is derived from the second random data, to a requester of the random value of the second type.

2. The method of claim 1, wherein the first type is a type of random value corresponding to an initialization vector used to encrypt data packets.

3. The method of claim 1, wherein the first random data request is a request for an unspecified length of random data.

4. The method of claim 1, wherein the second random data request is a request for a specified length of random data.

5. The method of claim 1, further comprising the steps, performed by the first random value requester, of:
receiving a third random value request from a requesting module;
sending the first random value request in response to receiving the third random value request;
receiving the random value of the first type in response to sending the first random value request; and
sending the random value of the first type to the requesting module.

6. The method of claim 1, wherein:
the first random data request is sent to a first port of the random number generator; and
the second random data request is sent to a second port of the random number generator.

7. The method of claim 1, further comprising:
selectively enabling storing the multiple random values in the data structure and producing the random values based on random value requests.

8. A method for producing random values, the method comprising the steps of:
providing a first random data request to a random number generator;
generating, by the random number generator, first random data in response to the first random data request;
storing multiple random values derived from the first random data in a buffer;
receiving an initialization vector request from an initialization vector requestor;
in response to receiving the initialization vector request, producing an initialization vector based on one of the multiple random values stored in the buffer;
sending the initialization vector to the initialization vector requester;
providing a second random data request to the random number generator in response to receiving a random value request for a random value other than an initialization vector; and
receiving second random data from the random number generator in response to sending the second random data request.

9. The method of claim 8, wherein providing the first random data request comprises asserting a request for an unspecified length of random data.

10. The method of claim 8, wherein providing the second random data request comprises asserting a request for a specified length of random data.

11. The method of claim 8, further comprising:
determining whether the buffer is full; and
when the buffer is full, de-asserting the request for the unspecified length of random data.

12. The method of claim 8, further comprising:
after sending the initialization vector to the initialization vector requester, determining whether the buffer is full; and
when the buffer is not full, re-asserting the request for the unspecified length of random data.

13. A system comprising:
a random number generator configured to generate random data in response to random data requests;
a data structure configured to store multiple random values, wherein the multiple random values are derived from first random data generated by the random number generator in response to first random data requests;
a first module coupled to the random number generator and to the data structure, and configured to provide the first random data requests to the random number generator, to receive first random value requests for first random values of a first type from a requester of the first random values, and to send the first random values to the requester of the first random values in response to the first random value requests, wherein the first random values are derived from the multiple random values stored in the data structure; and
a second module coupled to the random number generator and configured to provide second random data requests to the random number generator in response to receiving second random value requests for second random values of a second type from a requester of the second random values, to receive second random data from the random number generator in response to sending the second random data requests, and to send the second random values, which are derived from the second random data, to the requester of the second random values.

14. The system of claim 13, wherein the first type is a type of random value corresponding to an initialization vector used to encrypt data packets.

15. The system of claim 13, wherein the second module is further configured to receive third random value requests for the first random values from a third module, to send the first random value requests to the first module in response to receiving the third random value requests, to receive the first random values from the first module in response to sending the first random value requests, and to send the first random values to the third module.

16. The system of claim 13, wherein the random number generator comprises:
   a first port for receiving the first random data requests from the first module; and
   a second port for receiving the second random data requests from the second module.

17. The system of claim 13, wherein the random number generator is coupled to the data structure, and the random number generator is further configured to store the first random data in the data structure as the multiple random values.

18. The system of claim 13, wherein the first module is further configured to receive the first random data from the random number generator, and to store the first random data in the data structure as the multiple random values.

19. The system of claim 13, wherein the random number generator is a deterministic random number generator.

20. The system of claim 13, wherein the data structure is a first-in, first-out buffer.

\* \* \* \* \*